UNITED STATES PATENT OFFICE.

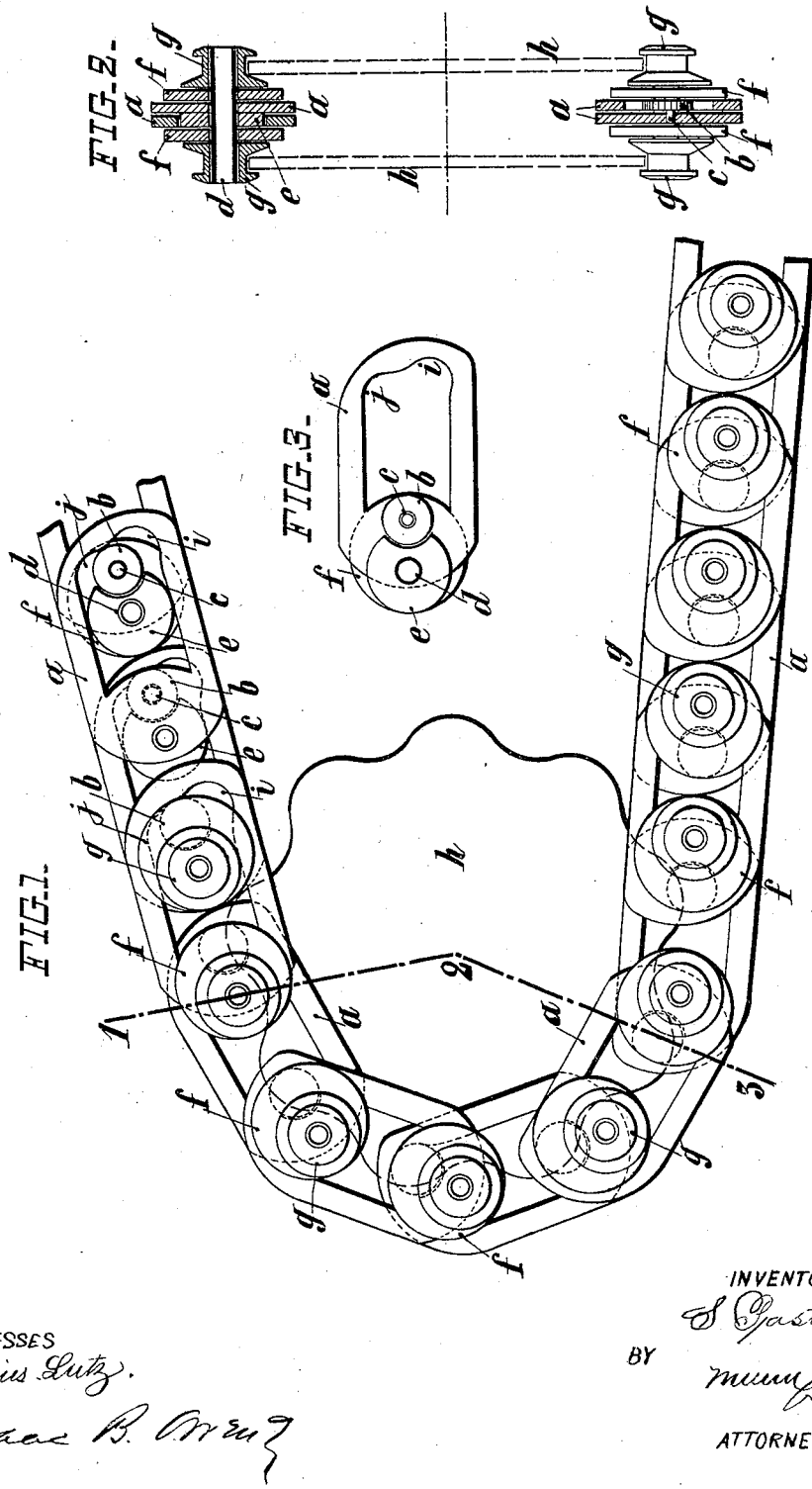

SALVADOR PASTOR, OF PARIS, FRANCE, ASSIGNOR TO HIMSELF, AND CHARLES MUSTON, OF ALGIERS, ALGERIA.

CHAIN FOR TRANSMITTING MOTION.

SPECIFICATION forming part of Letters Patent No. 601,525, dated March 29, 1898.

Application filed April 21, 1897. Serial No. 633,172. (No model.) Patented in France July 23, 1896, No. 258,318, and in Belgium January 20, 1897, No. 125,833.

*To all whom it may concern:*

Be it known that I, SALVADOR PASTOR, of the city of Paris, France, have invented an Improved Chain for the Transmission of Motion, (for which I have obtained Letters Patent in France, dated July 23, 1896, No. 258,318, and in Belgium, dated January 20, 1897, No. 125,833,) of which the following is a full, clear, and exact description.

My invention relates to an improved chain for the transmission of motion, which chain is susceptible of various mechanical applications and is more especially intended to be applied to bicycles, tricycles, and other velocipedes.

My invention is characterized by a special arrangement of the link-joints, which will be hereinafter described.

In my chain the links are jointed together by an eccentric hinge-joint in such a manner that the effective length of a link will be less in the parts of the chain which are in a straight line than in the parts thereof which are curved.

In order that my said invention may be clearly understood, I have shown my improved chain in the accompanying drawings in principle, but by way of example only.

Figure 1 is an elevation of the said chain. Fig. 2 is a transverse section on the line 1 2 3, Fig. 1; and Fig. 3 is a detail view of one link detached.

In the figures like letters of reference indicate corresponding parts.

My chain consists, essentially, in a series of links $a$, connected together as follows, viz: Each link is provided with a roller $b$, capable of turning freely about an axis $c$, and with an axis $d$, on which are mounted a packing-piece $e$, serving to compensate for the thickness of the roller $b$, two disks $f$, between which the succeeding link is guided, and two rollers $g$, which engage with the teeth in the two plates $h$ of the pinion or chain wheel to be driven by the said chain. Moreover, each link $a$ is provided with an internal recess $i$, formed in such a manner that when the links are in a curved part of the chain the roller $b$ of one link engages with the recess $i$ of the next link, and, on the contrary, when the links are in a straight line with each other each roller $b$ is in contact with the part $j$ of the succeeding link. It is to be understood that during all these motions the length of the chain remains the same, since as one link returns to a position in a straight line with the adjacent link, and its distance from the preceding link consequently becomes less, another link leaves the straight line to come into engagement with one of the teeth of the pinion or chain wheel, and its distance from the following link consequently increases by an equal amount.

As has been mentioned above, my chain can be applied in various ways and I can modify the form, dimensions, and secondary arrangements thereof according to the requirements of each particular application.

I claim—

1. A chain having a series of links, each link having a cammed surface, and each link also having a projection, and a disk mounted adjacent to said projection, the disks respectively engaging the inner walls of the links so that said links may rock on the disks, and the cammed surfaces of the links respectively engaging the projections so as to throw the links to various positions according to the disposition of the chain.

2. A chain having a series of links joined to each other and capable of independent movement, each link having at one end a cammed portion and at the other end a roller on which rollers the cammed portions respectively roll, whereby the positions of the links relative to each other are changed according to the position of the chain.

3. A sprocket-chain for the transmission of motion between two sprockets, the chain being composed of links, pins uniting the links, and means forming a part of the chain and serving automatically to shift the links lengthwise relatively to each other, such means acting on each link as that link turns on and off the sprocket-wheels.

The foregoing specification of my improved chain for the transmission of motion signed by me this 2d day of April, 1897.

SALVADOR PASTOR.

Witnesses:
 EDWARD P. MACLEAN,
 ALBERT MOREAU.